(12) United States Patent
Martinez et al.

(10) Patent No.: US 10,697,654 B2
(45) Date of Patent: Jun. 30, 2020

(54) AIR-CONDITIONING SYSTEM OF A BUILDING

(71) Applicant: BULL SAS, Les Clayes sous Bois (FR)

(72) Inventors: Patrice Martinez, Grenoble (FR); Jacques Cayuela, La Tronche (FR); Landry Stéphane Zeng Eyindanga, Seyssinet-Pariset (FR)

(73) Assignee: BULL SAS, Les Clayes sous Bois (FR)

( * ) Notice: Subject to any disclaimer, the term of this patent is extended or adjusted under 35 U.S.C. 154(b) by 0 days.

(21) Appl. No.: 15/741,446

(22) PCT Filed: Jul. 4, 2016

(86) PCT No.: PCT/EP2016/065726
§ 371 (c)(1),
(2) Date: Jan. 2, 2018

(87) PCT Pub. No.: WO2017/005701
PCT Pub. Date: Jan. 12, 2017

(65) Prior Publication Data
US 2018/0372350 A1 Dec. 27, 2018

(30) Foreign Application Priority Data
Jul. 3, 2015 (FR) .................................. 15 56334

(51) Int. Cl.
*F24F 5/00* (2006.01)

(52) U.S. Cl.
CPC ........ *F24F 5/0035* (2013.01); *F24F 2221/16* (2013.01)

(58) Field of Classification Search
CPC ............................ F24F 5/0035; F24F 2221/16
See application file for complete search history.

(56) References Cited

U.S. PATENT DOCUMENTS

| 4,064,706 A | 12/1977 | Stephens | |
|---|---|---|---|
| 4,761,965 A | 8/1988 | Viner | |
| 6,250,091 B1 * | 6/2001 | Jerome | F24F 5/0035 62/171 |
| 6,820,439 B1 | 11/2004 | Marek | |
| 8,443,794 B2 * | 5/2013 | Hulen | E01C 11/26 126/623 |

(Continued)

FOREIGN PATENT DOCUMENTS

DE   10 2011 108601 A1   1/2013

OTHER PUBLICATIONS

International Search Report as issued in International Patent Application No. PCT/EP2016/065726, dated Sep. 7, 2016.

*Primary Examiner* — Ana M Vazquez
(74) *Attorney, Agent, or Firm* — Pillsbury Winthrop Shaw Pittman LLP

(57) ABSTRACT

An air-conditioning system of a building includes a water supply system; a control system for controlling the flow of water from the water supply system; a water distribution system for distributing water near an outer surface of the building, the flow rate of the water being controlled by the control system; a water droplet generation system configured to generate water droplets from the water coming from the water distribution system, the water droplet generation system for generating water droplets generating water droplets on at least one portion of the outer surface of the building.

14 Claims, 2 Drawing Sheets

(56) References Cited

U.S. PATENT DOCUMENTS 8,689,490 B2 * 4/2014 Sumner .................. E04D 1/28
126/622
2012/0174606 A1 7/2012 Budike

* cited by examiner

AIR-CONDITIONING SYSTEM OF A BUILDING

CROSS-REFERENCE TO RELATED APPLICATIONS

This is the U.S. National Stage of PCT/EP2016/065726, filed Jul. 4, 2016, which in turn claims priority to French Patent Application No. 1556334, filed Jul. 3, 2015, the entire contents of all applications are incorporated herein by reference in their entireties.

TECHNICAL FIELD OF THE INVENTION

The present invention relates to an air-conditioning system of a building. The invention finds particularly interesting application in the air conditioning of buildings having poor insulation such as old buildings, or buildings for agricultural or industrial uses.

TECHNOLOGICAL BACKGROUND OF THE INVENTION

Today, numerous air-conditioning systems have been developed in order to meet the technical requirements of maintaining the temperature of certain premises (laboratories, operating theatres, computer rooms), or quite simply to improve comfort (shop, home, office).

Conventional air-conditioning systems known as "split-systems" are constituted of a unit placed inside a room and a unit placed outside said room. Thus, the internal unit draws on the heat contained in the air of the room and evacuates it out of the room through the external unit. Cooled air is thereby re-injected into the room by the internal unit. To do so, said system comprises an evaporator exchanger, a compressor, a regulator and a condenser exchanger.

However, this type of air-conditioning system has numerous drawbacks. Indeed, such systems are costly not just during their installation but also during their operation because they consume a large amount of electricity. Even more, when a building has poor insulation, the operating costs are all the greater because a portion of the cooled air escapes to the outside of the room. Finally, said systems may discharge greenhouse gases which could thus be harmful for the environment.

GENERAL DESCRIPTION OF THE INVENTION

In this context, the invention aims to provide a solution making it possible to air condition a room for a low installation and operating cost. Moreover, the solution according to the invention is more ecological. To this end, the invention proposes an air-conditioning system ensuring cooling of a building by an intervention on at least one outer wall of the building considered.

The invention thus essentially relates to an air-conditioning system of a building characterised in that it comprises:
water supply means,
control means for controlling the flow of water in order to control the flow of water from the water supply means,
distribution means for distributing water near an outer surface of the building, the flow rate of said water being controlled by the control means,
generation means for generating water droplets in order to generate water droplets from the water coming from the distribution means, said generation means generating water droplets on at least one portion of the outer surface of the building.

The air-conditioning system according to the invention makes it possible to resolve the aforementioned problems.

Indeed, the installation of such an air-conditioning system uniquely requires works to be carried out outside the building, which does not lead to any loss of exploitation of said building, for example when it is used for agricultural or industrial purposes. Furthermore, the installation works and the materials required to put the air-conditioning system in place are inexpensive compared to the installation works (drilling) and the purchase of materials for the traditional air-conditioning systems described previously. Moreover, the operating cost of the air-conditioning system according to the invention is low provided that an abundant and cheap water source is present in or near the building. Finally, the air-conditioning system uniquely consumes water, which does not present a risk for the environment. Advantageously, when the air-conditioning system comprises a water recovery tank, water not having been used during the building cooling process may be made use of again, for example, for watering or instead as water supply means.

The air-conditioning system according to the invention may have one or more of the characteristics below, considered in a non-limiting manner, individually or according to all technically possible combinations thereof.
the water distribution means comprise at least one first pipe with an internal diameter comprised in the interval [12 mm; 40 mm], preferentially 19 mm
the means for generation water droplets comprise at least one second pipe with a plurality of openings provided in a wall of each at least one second pipe
each second pipe has an internal diameter comprised in the interval [8 mm; 30 mm], preferentially 13.6 mm
each opening has a diameter comprised in the interval [0.5 mm; 1.5 mm], preferentially 1 mm
the diameter of the openings increases with the distance between each opening considered and the control means
the water distribution means and the generation means form a one-piece element
the water supply means comprise phreatic groundwater
the water supply means comprise a means of accessing running water
the control means comprise a pump
the control means are connected to a thermostat
the generation means are connected to water recovery means
the outer surface of the building is at least one portion of the roof of said building
the outer surface of the building is at least one portion of a wall of said building.

The invention will be better understood in light of the description that follows and with reference to the figures, the list of which is given below.

BRIEF DESCRIPTION OF THE FIGURES

The figures are only given for indicative purposes and are in no way limiting.

DETAILED DESCRIPTION OF EMBODIMENTS OF THE INVENTION

Unless stated otherwise, a same element appearing in different figures has a single reference.

Figure 1:
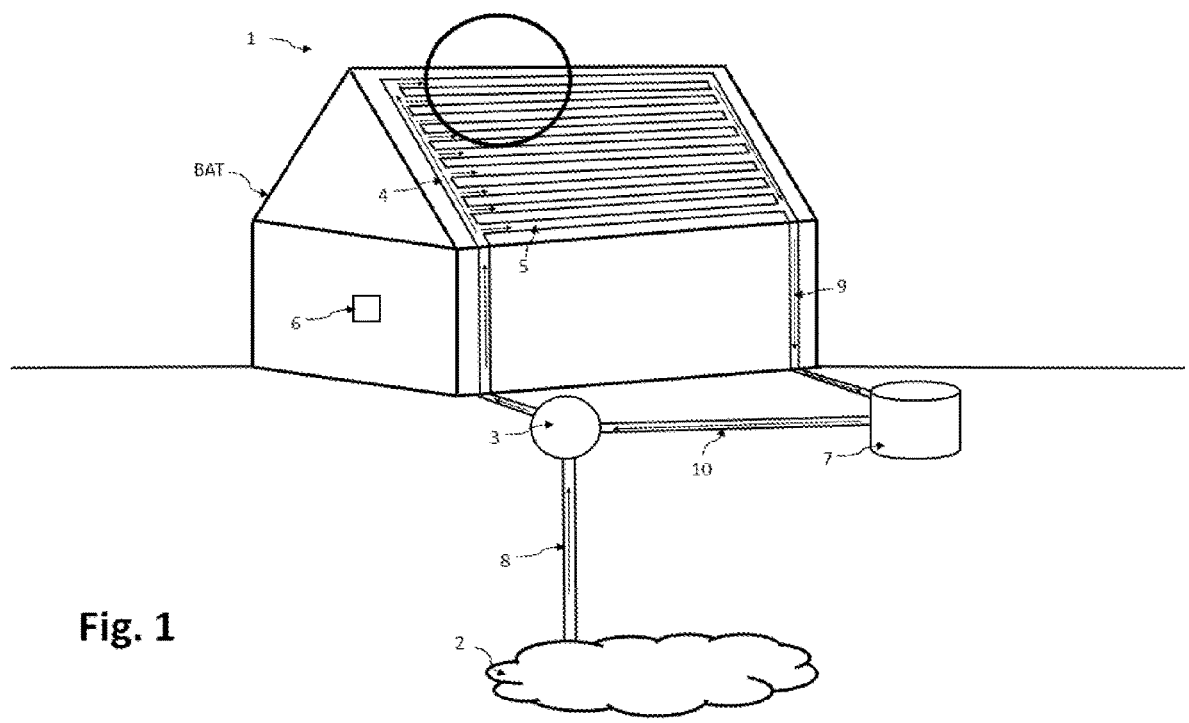
FIG. 1 schematically represents the air-conditioning system positioned on the roof of a building according to an embodiment of the invention.

The invention relates to a system 1 for air-conditioning a building BAT from the outside. FIG. 1 represents the air-conditioning system 1 in position on the roof of a building BAT according to an embodiment of the invention. According to another embodiment, the air-conditioning system 1 is positioned on the walls of a building BAT. In this embodiment, the walls must have insulation against humidity.

With reference to FIG. 1, the air-conditioning system 1 comprises:
water supply means 2,
control means 3,
distribution means 4,
generation means 5,
a thermostat 6,
a water recovery tank 7.

The water supply means 2 are intended to supply the air-conditioning system 1 with water, preferentially with cold water. According to an embodiment, the water supply means 2 are phreatic groundwater near the building from where the water is drawn. The phreatic groundwater is then connected to a first piping 8 which enables the transportation of water to the other components of the air-conditioning system 1. According to another embodiment, the water supply means 2 are a tap of running water. According to another embodiment, the supply means 2 are a water recovery tank, for example which recovers rain water or instead water not having been used during the process of cooling the building BAT.

The control means 3 for controlling the flow of water are intended to pump water from the supply means 2 and to make said water flow up to the roof of the building BAT to be cooled. Thus, the control means 3 are connected, via a first end to the first piping 8 which is connected to the supply means 2. A second end of the control means 3 is connected to the water distribution means 4. Furthermore, the pressure of the water imposed by the control means 3 has to be sufficient to reach the roof of the building BAT and thereby optimise the process of cooling the building BAT. According to an embodiment, the pressure of the water at the outlet of the control means 3 is comprised in the interval [1 bar; 10 bars], preferentially 5 bars. According to an embodiment, the control means 3 are formed by a pump. Moreover, according to the embodiment shown in FIG. 1, the control means 3 are positioned near the building BAT.

The distribution means 4 are intended to transport water to the roof of the building BAT, the pressure of said water having, beforehand, been controlled by the water control means 3. Thus, a first end of the distribution means 4 is connected to the control means 3 for controlling the flow of water. A second end of the distribution means 4 is connected to the generation means 5 for generating water droplets. According to an embodiment, the distribution means 4 are a first pipe 4 of internal diameter comprised in the interval [12 mm; 40 mm], preferentially 19 mm. According to another embodiment, the distribution means 4 are a plurality of first pipes 4 spread out on the roof of the building BAT, each first pipe 4 being connected to the control means 3. Furthermore, according to an embodiment, said distribution means 4 are attached to an outer surface of the building BAT by means of attachment clamps attached by screws and plugs to the wall, and to the roof by direct bonding by spots of adhesive, or fastening of a polyvinylchloride (PVC) type open clamp, it also bonded.

Figure 2:
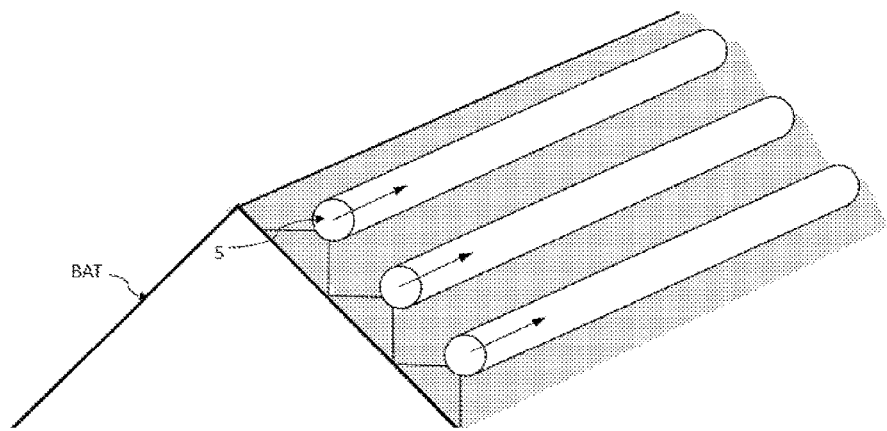
FIG. 2 is an enlargement of a circled area of the air-conditioning system shown in FIG. 1.
Figure 3:
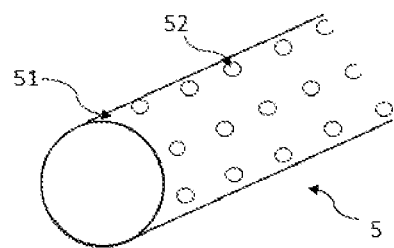
FIG. 3 schematically represents means for generating water droplets according to an embodiment of the invention.

The generation means 5 for generating water droplets are intended to generate water droplets on the roof of the building BAT. Said generation means 5 are connected, via a first end, to the distribution means 4 and are positioned attached to the roof of the building BAT. A second end of the generating means 5 is connected to the recovery tank 7. According to the embodiment shown in FIGS. 1 and 2, the generation means 5 for generating water droplets are a plurality of second pipes 51. According to an embodiment, the internal diameter of each second pipe 51 is comprised in the interval [8 mm; 30 mm], preferentially 13.6 mm. According to the embodiment shown in FIG. 3, each second pipe 51 comprises a plurality of openings 52 provided in the wall of said second pipe 51. The generation means 5 for generating water droplets are positioned such that the openings 52 are positioned facing the roof of the building BAT. According to an embodiment, each opening 52 has a diameter comprised in the interval [0.5 mm; 1.5 mm], preferentially 1 mm. Moreover, according to an embodiment, the further the openings 52 of the second pipes 51 are from the control means 3, the greater the diameter of said openings 52.

The thermostat 6 is intended to remotely control the temperature of the building BAT by a user of the air-conditioning system 1. Thus, the thermostat 6 is connected to the control means 3. Indeed, when the water pressure increases, the temperature of the building BAT decreases such that a modification of the temperature on the thermostat 6 induces a modification of the pressure applied by the control means 3. Furthermore, when a user wishes to stop the air conditioning of the building BAT, he may switch off the thermostat 6 which leads to the stoppage of the control means 3 which no longer draws water from the water supply means 2.

The water recovery tank 7 is intended to recover water not having served in the cooling method. The water recovery tank 7 is connected to the generation means 5 through a second piping 9. According to the embodiment shown in FIG. 1, said recovery tank 7 is also connected to the control means 3 through a third piping 10 connected to a second end of the control means 3. Thus, water not having been used during the cooling method may be used again. Moreover, according to another embodiment, the water contained in the recovery tank 7 is re-used for watering for example or instead for the bathroom. The recovery tank 7 thereby makes it possible to avoid any loss of water.

Thus, the first piping 8, the second piping 9 and the third piping 10 are used to transport water for the implementation of the piping system 1. According to an embodiment, the pipings 8, 9 and 10 have a diameter comprised in the interval [20 mm; 50 mm], preferentially 40 mm.

Moreover, the material used for the water distribution means 4, the generation means 5 for generating water droplets as well as the pipings 8, 9, 10 is selected so as to withstand high water pressures. According to an embodiment, the material used is polyethylene.

Figure 4:
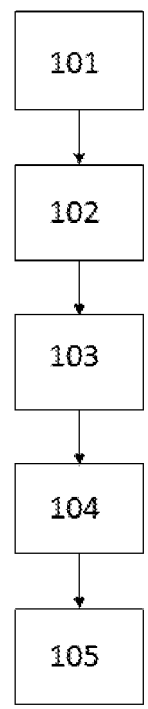
FIG. 4 is a block diagram illustrating the steps of the method of cooling a building from the outside according to an embodiment of the invention.

FIG. 4 represents the steps of the method of cooling a building BAT from the outside according to an embodiment of the invention.

As a reminder, in a building BAT, intense heating of the surfaces exposed to the sun causes a rise in temperature inside said building BAT. It may be noted moreover that, at its zenith, the sun produces a power substantially equal to 1 kW (Kilowatt) per square metre.

Thus, according to a step 101, the water contained in the water supply means 2 is pumped by the control means 3 for controlling the flow of water that passes through the first piping 8.

According to a step 102, the water pumped by the control means 3 is transported at a predetermined pressure to the roof of the building BAT via the water distribution means 4.

According to a step 103, the water is transported from the distribution means 4 to the generation means 5.

According to a step 104, the water contained in the generation means 5 for generating water droplets passes through the openings 52 of said generation means 5. Water droplets are then generated facing the roof of the building BAT. A portion of the droplets is brought into contact with the roof superheated by solar radiation. Thus, a large amount of heat is absorbed by the evaporation of the water droplets leading to a reduction in the temperature of the roof and thereby to a drop in temperature inside the building BAT.

According to a step 105, a portion of the water contained in the second pipe(s) 51 of the generation means 5 that has not gone through the openings 52 is recovered in the recovery tank 7 through the second piping 9. According to another embodiment, the piping system 1 does not comprise second piping 9, the drainpipes of the building BAT making it possible to transport water to the recovery tank 7.

The piping system 1 according to the invention enables a drop in temperature of up to 7 degrees inside the building BAT thereby equipped.

The invention claimed is:

1. An air-conditioning system of a building, comprising:
a water supply system,
a control system configured to control a flow of water from the water supply system,
a distribution system configured to distribute water near an outer surface of the building, a flow rate of said water being controlled by the control system,
a water droplet generation system configured to generate water droplets from the water coming from the distribution system, said water droplet generation system generating water droplets on at least one portion of the outer surface of the building, the water droplet generation system comprising at least one second pipe with a plurality of openings provided in a wall of each at least one second pipe, and wherein a diameter of the openings increases with a distance between each opening considered and the control system.

2. The air-conditioning system according to claim 1, wherein the distribution system comprises at least one first pipe with an internal diameter comprised between 12 mm and 40 mm.

3. The air-conditioning system according to claim 2, wherein the internal diameter is 19 mm.

4. The air-conditioning system according to claim 1, wherein each second pipe has an internal diameter comprised between 8 mm and 30 mm.

5. The air-conditioning system according to claim 4, wherein the internal diameter is 13.6 mm.

6. The air-conditioning system according to claim 1, wherein the diameter of the openings is comprised between 0.5 mm and 1.5 mm.

7. The air-conditioning system according to claim 1, wherein the water distribution system and the water droplet generation system form a one-piece element.

8. The air-conditioning system according to claim 1, wherein the water supply system comprises a phreatic groundwater.

9. The air-conditioning system according to claim 1, wherein the water supply system is constructed and arranged to access running water.

10. The air-conditioning system according to claim 1, wherein the control system comprises a pump.

11. The air-conditioning system according to claim 1, wherein the control system is connected to a thermostat.

12. The air-conditioning system according to claim 1, wherein the water droplet generation system is connected to a water recovery system.

13. The air-conditioning system according to claim 1, wherein the outer surface of the building is at least one portion of a roof of said building.

14. The air-conditioning system according to claim 1, wherein the outer surface of the building is at least one portion of a wall of said building.

* * * * *